United States Patent [19]
Chang

[11] Patent Number: 5,861,851
[45] Date of Patent: Jan. 19, 1999

[54] MOBILE-PHONE ANTENNA DEVICE DIRECTLY INSERTION CONNECTABLE TO AN EXTERNAL ANTENNA

[75] Inventor: Daniel Chang, Pa-Te, Taiwan

[73] Assignee: Auden Technology Mfg. Co., Ltd., Tao-Yuan Hsien, Taiwan

[21] Appl. No.: 826,188

[22] Filed: Mar. 27, 1997

[51] Int. Cl.⁶ .................. H01Q 1/24; H01Q 1/50
[52] U.S. Cl. .................. 343/702; 343/906; 343/858; 439/582; 439/916
[58] Field of Search .................. 343/702, 906, 343/858; 439/675, 63, 578, 582, 916

[56] References Cited

U.S. PATENT DOCUMENTS 2,632,106  3/1953  Carlson ........................ 343/906
5,357,262  10/1994 Blaese ........................ 343/702

Primary Examiner—Michael J. Tokar
Assistant Examiner—Qui Van Duong
Attorney, Agent, or Firm—Pro-Techtor International Services

[57] ABSTRACT

A mobile-phone antenna device capable of insertion connecting directly to an external antenna, wherein, on the bottom of the exposed portion of the body of a fixed antenna thre is provided with an enlarged base of suitable size with one side thereof being provided with a socket; the base and the lateral socket are arranged to be higher slightly than the top surface of the mobile-phone, so that the socket can be connected with a corresponding plug on the external antenna. The antenna of the whole mobile-phone thus can be connected with the external antenna directly, this can eliminate inconvenience induced from repeated and optional insertion in and pulling out different antennae.

4 Claims, 5 Drawing Sheets

MOBILE-PHONE ANTENNA DEVICE DIRECTLY INSERTION CONNECTABLE TO AN EXTERNAL ANTENNA

BACKGROUND OF THE INVENTION

1. Field of the Invention

The present invention is related to a mobile-phone antenna device capable of insertion connecting directly to an external antenna, and especially to the case that the antenna seat of the mobile-phone can be insertion mounted directly with an external antenna such as the one used on a car.

2. Description of the Prior Art

Increasing of signal receiving capability of a mobile-phone ordinarily is obtained by providing an antenna on the top surface of the phone. Such kind of mobile-phone generally includes the fixed style, stretchable style and exchangeable style; the stretchable style is somewhat in-convenient in use, recently, people mostly use the fixed style shorter antennae having stronger signal receiving capability. While the exchangeable style antennae are normally used on the mobile-phones having each an adapter for its antenna, a user can substitute a different style of antenna for it.

When a mobile-phone is carried into a car, the signal emitting and receiving capability thereof normally is inferior during running of the car. To increase the signal receiving capability thereof, an external antenna should be added on a car, when the mobile-phone is connected with the external antenna, more desired using efficiency can be obtained. In order to connect with the external antenna for the car, normally an additional connector will be used for connecting with the external antenna for the car after it is mounted on the mobile-phone. However, such mode of structure is inconvenient due to using of the additional connector.

In the just developed connectors, therefore, taking the U.S. Pat. No. 5,524,284 titled "Antenna adpter for portable cellular telephone" as an example, an adapter is provided directly on the top surface of the mobile-phone, so that various styles of antennae can be used on this adapter through selection of the above stated exchangeable style antennae. Such exchangeable style antennae are divided generally into two kinds, one includes the normally used antennae, while the other includes the external antennae like that used on a car. A normally used antenna is comprised of a conducting rod of which the length may be varied, and a threaded coaxial connection on the bottom thereof capable of being locked in a threaded recess provided in the adapter to be used as a normal antenna of a mobile-phone. The other kind of external antennae each is comprised of a connecting element and a mounting assembly having an antenna, a cable is used to connect the connecting element and the mounting assembly, a magnetic pad is provided on the bottom of the mounting assembly to locate the mounting assembly of the external antenna at an appropriate position. When the external antenna is to be used, the connecting element can be locked in the threaded recess provided in the adapter. The largest defect of such mobile-phone which has to use an adapter is that, it uses a normal antenna when in the ordinary situation, while if it is carried into a car, the normal antenna must be removed from the adapter to expose the threaded recess provided in the adapter, and then connect and lock the external antenna thereto for use. On the countrary, when getting off the car, the external antenna must be removed, and remount the normal antenna, this is bothersome in operation.

SUMMARY OF THE INVENTION

The object of the present invention is to provide a a mobile-phone antenna device capable of insertion connecting directly to an external antenna, wherein, a socket is provided on the back side of a fixed antenna near one end of the top surface of the mobile-phone, the socket is connected with a central contact member of the fixed antenna, an external annular contact sheet and a central electrode pipe are held in this socket, an insertion hole is formed between the two members and is electrically insulated, thereby, an ordinary fixed antenna in a normal state can have an option of whether it is to be connected an external antenna, this can eliminate inconvenience induced from repeated and optional insertion in and pulling out different antennae, and the main motive of the present invention is resided herein.

The present invention will be apparent in its novelty and other characteristics after reading the detailed description of the preferred embodiments thereof in reference to the accompanying drawings.

DETAILED DESCRIPTION OF THE PREFERRED EMBODIMENT

Figure 1:
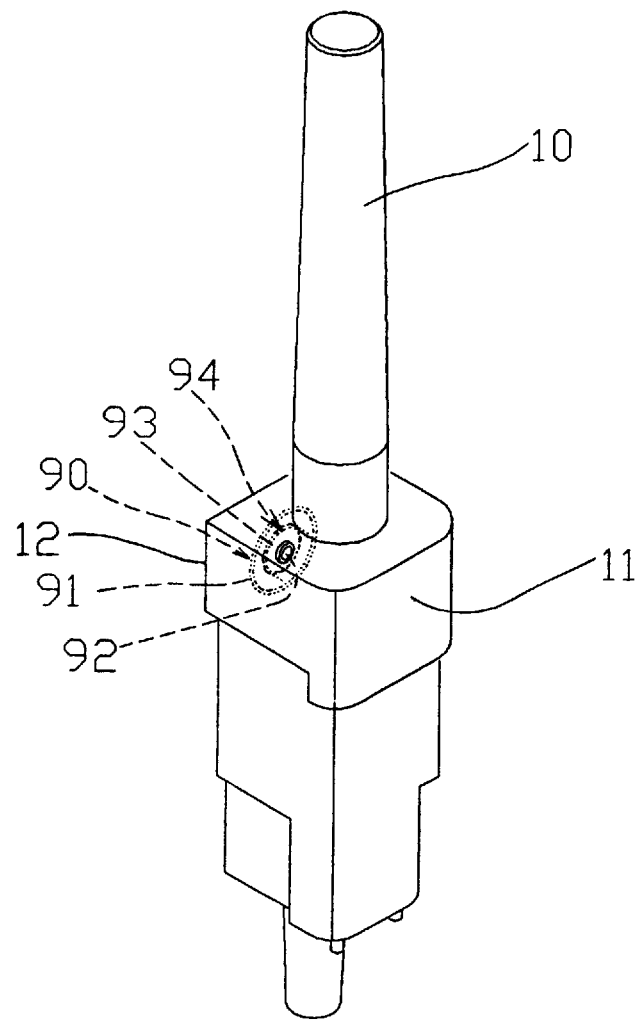
FIG. 1 is a perspective view of a preferred embodiment of the present invention.

Referring to FIG. 1, taking a fixed antenna mounted on a mobile-phone as an example; the present invention is provided with an exposed antenna body 10 mounted on the top of the mobile-phone, the main characteristic of the present invention resides in that, the bottom of the exposed portion of the antenna body 10 is provided with an enlarged base 11, in the preferred embodiment shown in the drawing, the base 11 is formed as a block with one back side 12 thereof being provided with a female socket 90. An external annular contact sheet 91 and a central electrode pipe 92 are held in this female socket 90, an insulation pipe 93 of suitable diameter encircles the central electrode pipe 92 to thereby form an insertion hole 94.

Figure 2:
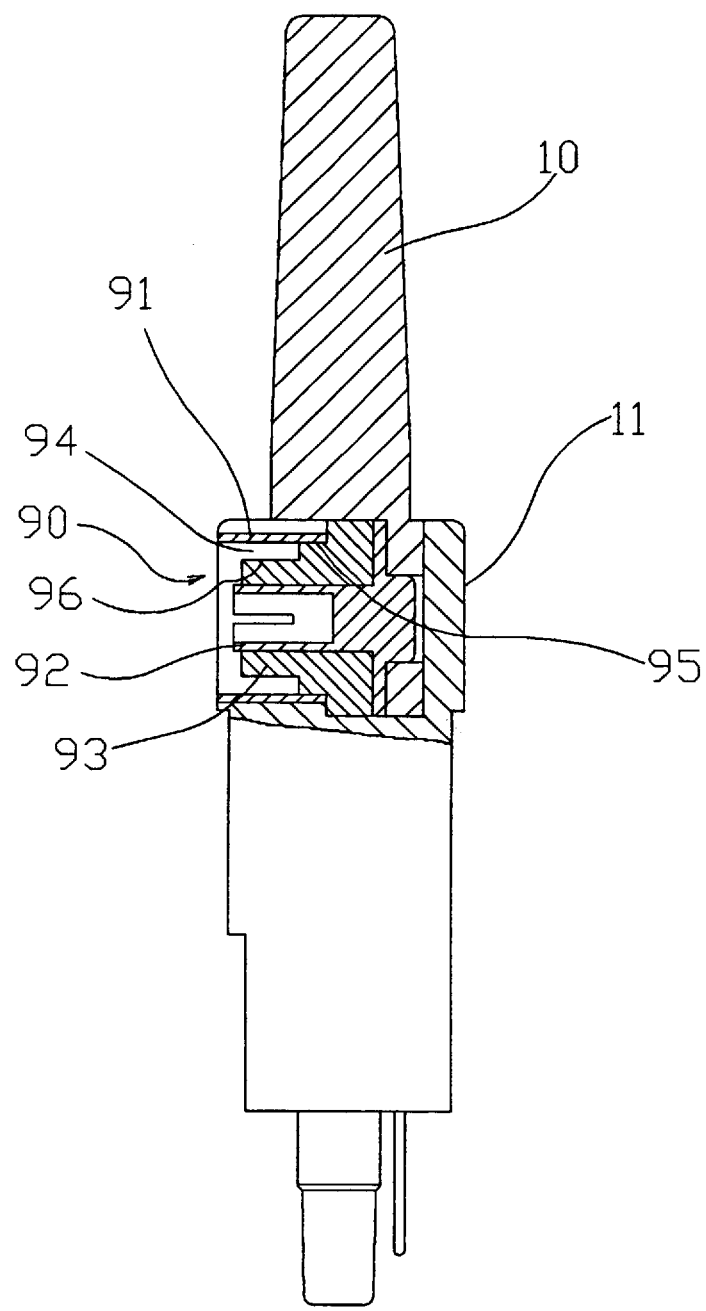
FIG. 2 is a partial sectional view of the embodiment of FIG. 1.

As shown in the embodiment of FIG. 2, in the preferred embodiment of the female socket 90 shown in this drawing, the central electrode pipe 92 is connected with a central contact member of the fixed antenna, while the external annular contact sheet 91 is positioned on an upper stepped portion 95 of the duplex stepped portions 95, 96 provided on the insulation pipe 93, so that the insertion hole 94 can be formed between the external annular contact sheet 91 and the lower stepped portion 96, and is connectable to a matching plug to thereby form a loop.

Figure 3:
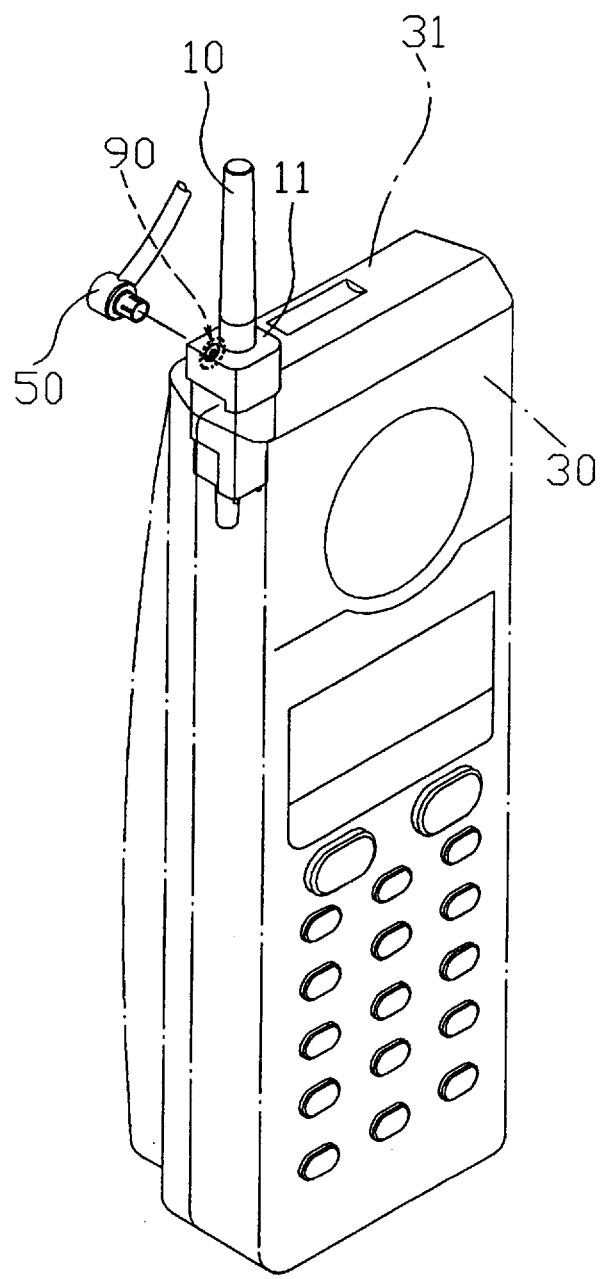
FIG. 3 is a schematic view showing the present invention is mounted on a mobile-phone.
Figure 4:
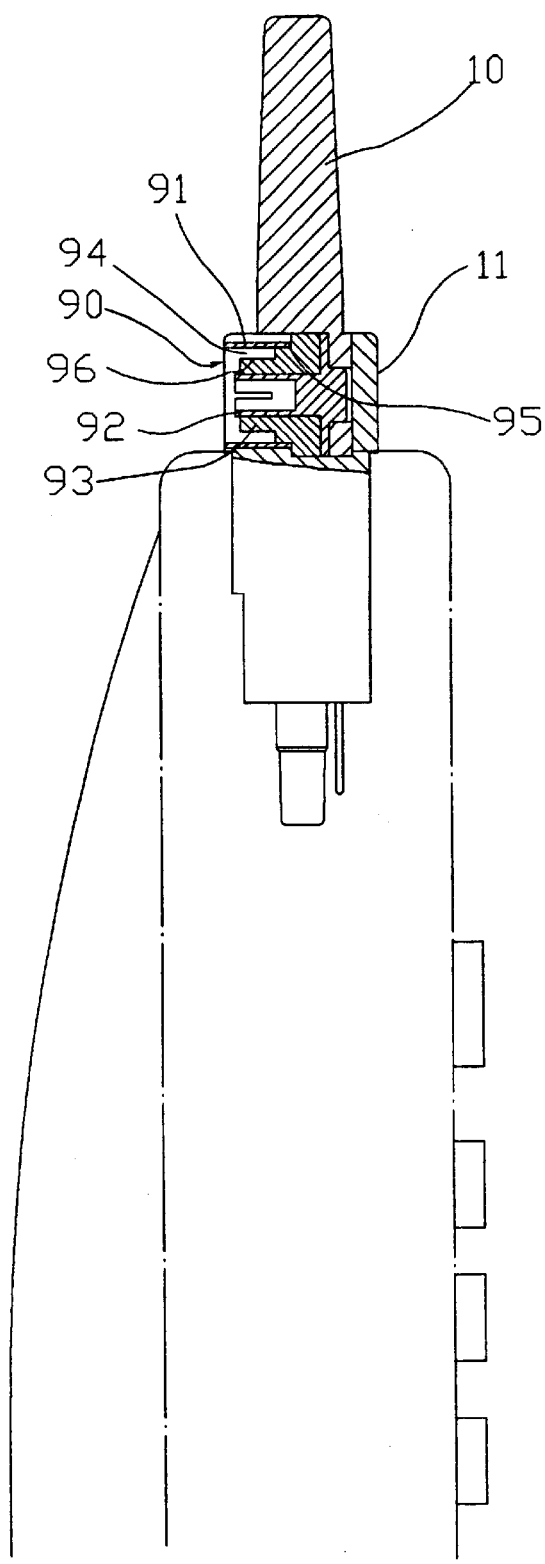
FIG. 4 is a partial sectional front view of the embodiment of FIG. 3.

Referring to FIG. 3, 4, taking a normal mobile-phone as an example, after the present invention is mounted on a mobile-phone 30, the base 11 is arranged to be higher slightly than the top surface 31 of the mobile-phone 30, hence the female socket 90 is exposed. In the preferred embodiment shown in the drawing, the female socket 90 is faced backwardly of the mobile-phone 30, so that it can be connected with a corresponding plug 50 on an external antenna conveniently without impediment to the front control area of the mobile-phone 30.

Figure 5:
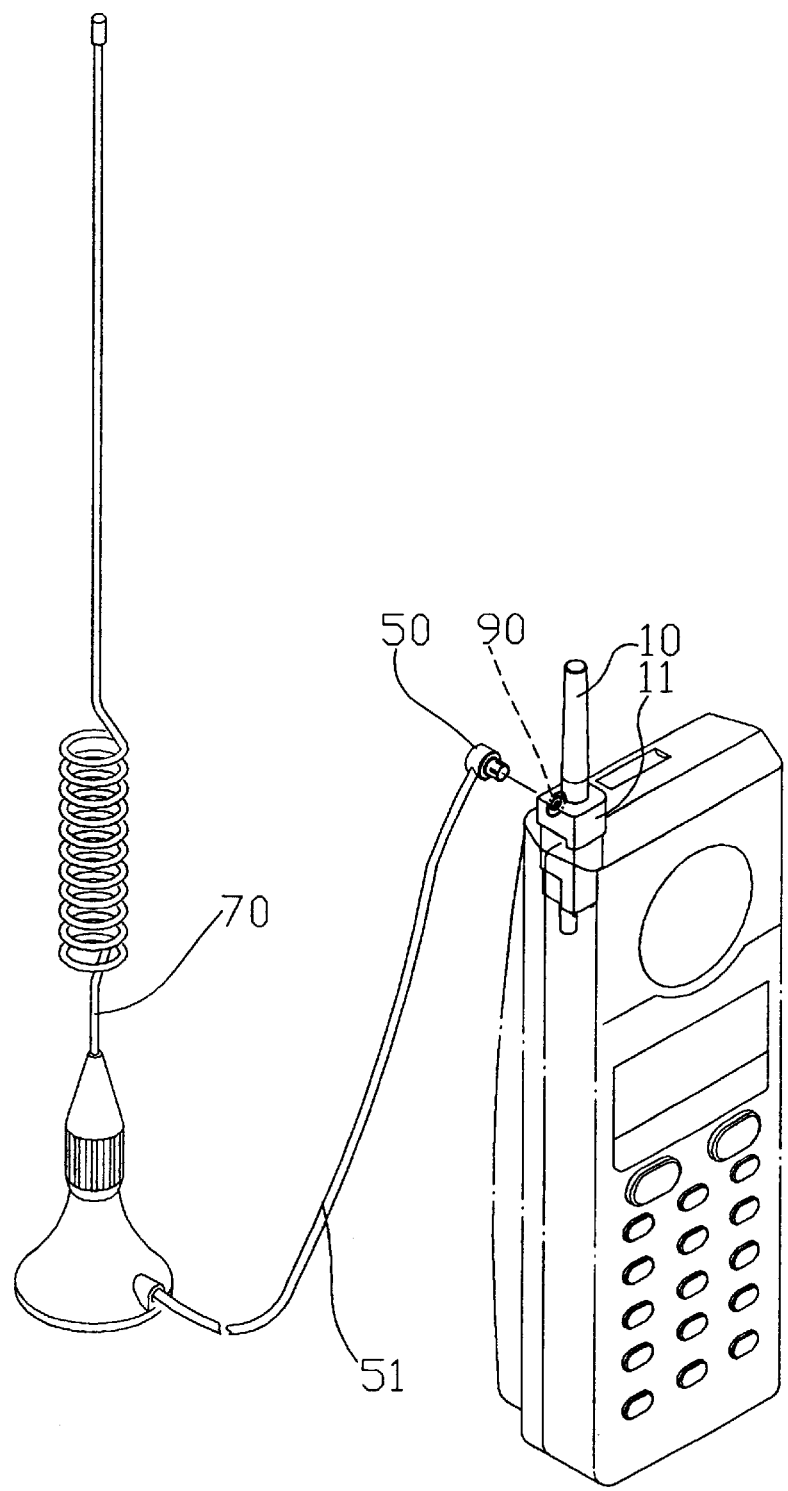
FIG. 5 is a schematic view showing the present invention is used on an external antenna for a car.

In the embodiment referring to FIG. 5, the plug 50 can be connected to the external antenna 70 of a car through a conductor 51 of suitable length, so that the whole mobile-phone 30 can be connected with the external antenna 70 of the car for receiving signals.

Because of the female socket 90 provided integrally on the back side of the fixed antenna of the mobile-phone 30, the present invention can emit and receive signals through the fixed antenna in a normal state, and when getting in the car, it only needs to insert the plug 50 provided antecedently for the car antenna directly in the female socket 90 provided on the fixed antenna to render the fixed antenna to work, this can eliminate inconvenience induced from repeated and optional insertion in and pulling out different antennae, and therefore is practical and improved in effect. Having thus described the technical structure of my invention, what I claim as new and desire to be secured by Letters Patent of the United States are:

What is claimed is:

1. A mobile-phone antenna device adapted to directly receive a plug of an external antenna, wherein:

on a lower side of an exposed portion of a body of a fixed antenna is an enlarged base, one side of said base is provided with a socket; said base and said socket are positioned so as to protrude slightly above a top surface of a mobile-phone, so that said socket can be connected to said plug on said external antenna by a friction fit connection, thereby eliminating the need for any threaded connector or adapter means.

2. The mobile-phone antenna device as claimed in claim 1, wherein:

an external annular contact sheet and a central electrode pipe are held in said socket, an insulation pipe encircles said central electrode pipe, said insulation pipe is provided with duplex stepped upper and lower portions, said external annular contact sheet is positioned on said upper stepped portion so that an insertion hole is formed between said external annular contact sheet and said lower stepped portion.

3. The mobile-phone antenna device as claimed in claim 1, wherein:

said socket on said enlarged base is is positioned on a rear side of said mobile-phone.

4. The mobile-phone antenna device as claimed in claim 1, wherein:

said corresponding plug on said external antenna is connected to said external antenna by means of a conductor.

* * * * *